March 18, 1969 A. J. CAREY ET AL 3,433,373
AUTOMATIC VEHICLE DOOR CONTROL SYSTEM
Filed March 24, 1966

INVENTORS
Andrew J. Carey and
Chalmers W. Gilbert.
BY W. L. Stout
THEIR ATTORNEY

United States Patent Office 3,433,373
Patented Mar. 18, 1969

3,433,373
AUTOMATIC VEHICLE DOOR CONTROL SYSTEM
Andrew J. Carey, West Mifflin, and Chalmers W. Gilbert, Penn Hills Township, Allegheny County, Pa., assignors to Westinghouse Air Brake Company, Swissvale, Pa., a corporation of Pennsylvania
Filed Mar. 24, 1966, Ser. No. 537,201
U.S. Cl. 214—63           37 Claims
Int. Cl. B65g 67/24; B61d 7/30; B60p 1/56

ABSTRACT OF THE DISCLOSURE

A system for automatically opening the doors of a moving vehicle having wayside apparatus operating in combination with vehicle-carried electropneumatic apparatus. The wayside apparatus is located in the vicinity of a preselected area for producing a signal within a space defined by first and second variable wayside points. The vehicle-carried apparatus is under supervisory control for being initially conditioned to be responsive to the reception of the wayside signal as the vehicle passes the first door opening operation and is responsive to the interruption of the wayside signal as the vehicle passes the second wayside point for causing a pneumatic door closing operation.

Our invention relates to an automatic vehicle door control system and more particularly to an electropneumatic system for automatically opening and closing doors of vehicles at a preselected wayside area.

More specifically, our invention relates to a system for automatically opening the doors of moving railway vehicles as they pass a first wayside point in a preselected area and for closing the doors of the moving railway vehicle as they pass a second wayside point in the preselected area. Suitable wayside apparatus is located in the vicinity of said preselected area for producing a signal within a space defined by said first and second wayside points. Each of the railway vehicles includes electropneumatic apparatus which is electrically responsive upon reception of the wayside signal as the vehicle moves past the first wayside point for causing a pneumatic door opening operation and is electrically responsive upon interruption of the wayside signal as the vehicle moves past the second wayside point for causing a pneumatic door closing operation.

In recent years the keenness of competition has demanded a reduction in the cost of hauling or transporting bulk material by railway carriers. For example, the electrical power generating utilities are among the leaders in these lower cost demands for the transportation of coal for the generation of steam for their power plants. In order to compete against fuels, such as, gas, oil, and particularly nuclear energy, the railway carriers have developed and employed the unit-train service for carrying the single commodity of coal from the mine location to the steam power generating plant site. The unit-train development appears to have provided the railroads with the economic capability of meeting competition; however, in order to ensure maximum-efficiency and minimum-cost operation, the coal and railroad industries are constantly striving to improve their position. An example of several recent advancements and improvements in unit-train service has been the railroads' use of "super" railway cars, such as the 100 ton hopper cars, and industries' employment of loading-in-motion of these open-top hopper cars at the mine sites.

Particular attention is now being directed to the destination or plant location wherein the unloading or dumping of the coal takes place. Previously, the unloading of the contents of hopper cars was normally performed either manually or electromechanically, each of which involved the spotting of the hopper cars and required the stopping of the train over the dumping area. For example, in a manual unloading operation an approaching coal train requires an attendant for properly spotting the hopper car or cars over the dumping area and for signaling the engineer to bring the train to a halt at the spot. When the train is completely stopped the attendant or some other authorized individual manually opens the hopper doors and if need be attaches a vibrator or car shaker for unloading the contents of the car. When the spotted car or cars are completely emptied the doors are manually closed, and the engineer is signaled to move the train for the next car or cars spotting and dumping operation. Similarly, in a previous electromechanical dumping operation the same spotting, stopping and starting sequence is followed, but the hopper doors are opened and closed through a mechanism which is operated by an electric motor which received its electrical energy through a suitable retractable bus connector arrangement from a local wayside power source. Obviously, these former arrangements are not only inefficient, time consuming, and costly but also form a weak link in the unit-train operating chain.

Accordingly, a new advance in unit-train operations is the dumping or unloading of the entire cargo of coal automatically at the destination site. Further, it would be highly advantageous from the standpoint of efficiency, cost and safety to rapidly unload the hopper cars in an automatic manner at the destination location while the train is on the move. That is, in order to more effectively utilize the full potential of the railway hopper cars of a unit-train in a coal delivery operation, it is quite obvious that a continually moving process, namely, operate the train without stopping, would produce the highest degree of efficiency. Further, a continuous moving operation normally requires the use of a fewer number of cars because of the fact that stopping delays proportionately reduce the effective number of times a car may be loaded and unloaded within a given period of time. In addition, the total number of man-hours per load is proportionately reduced in a continuous moving train operation since the time spent in spotting the cars and stopping the train would be eliminated. Similarly, the fully automatic feature of unloading the hopper cars would additionally reduce the trainload rates on coal since the need for apparatus such as car-shakers, cranking mechanisms in manual operation, and/or bus connected equipment in semi-automatic operation, and the personnel for handling this apparatus and the spotting operation would be removed. However, other essential requirements of automatic moving car unloading or dumping systems are high reliability of operation of the equipment and longevity of the various elements of the apparatus. For example, since the train and particularly the railway hopper cars may be exposed to severe coldness which in some cases may reach sub-zero temperatures, special precautions must be taken to ensure proper operation of the car-carried apparatus under such adverse weather conditions.

Accordingly, it is an object of our invention to provide a new and improved system for automatically opening and closing doors of a vehicle while in motion.

Another object of our invention is an improved system for automatically opening and closing the doors of bulk material carrying vehicles on the move.

A further object of our invention is to provide a unique system for automatically unloading cars of a unit-train without the need of stopping the train at the dumping area.

A still further object of our invention is to provide an improved fail-safe railway car unloading system which automatically dumps an entire cargo of bulk material at an unloading zone while the train is in motion.

Yet another object of our invention is to provide an improved electropneumatic vehicle door control system which is pneumatically conditioned from the vehicle and which is electrically controlled from the wayside in accordance with the availability of a particular location within a preselected area.

Still yet a further object of our invention is to provide an improved system for automatically opening and closing the doors of hopper cars of a unit-train having electropneumatic car-carried apparatus which is pneumatically conditioned as the train approaches a preselected area and having electrical wayside apparatus which is effective in controlling the car-carried apparatus for opening the doors of the hopper cars in accordance with the availability of the preselected area.

Still yet another object of our invention is to provide a unique railway vehicle door control system which is economical in cost, simple in construction, reliable in operation, durable in use, and efficient in service.

The system according to the present invention employs wayside apparatus in combination with vehicle-carried electro-pneumatic apparatus for automatically opening the doors of a moving vehicle as it passes a first wayside point in a receiving area and for automatically closing the doors of the moving vehicle as it passes a second wayside point in the receiving area. The wayside apparatus located in the vicinity of the receiving area includes a tone signal transmitter having its input electrically coupled to an alternating current energy source through a surge suppressor and a direct current power supply. The output of the tone signal transmitter is electrically coupled to a variable length antenna which includes a plurality of switch controlled transmitter coils. The transmitter coils are electrically interconnected in accordance with the condition or availability of the receiving area. The pneumatic carried apparatus includes a train line, a reservoir, a pressure responsive switching device, a directional control valve having a first and second solenoid and a door operating cylinder pneumatically interconnected to perform a door opening and closing operation. The electric car-carried apparatus includes a coil tuned to the tone signal energy, a receiver, a control relay, a timing relay, and a switch controlled battery power supply. In approach to the receiving area, the pneumatic apparatus is initially conditioned by charging the train line to a prescribed pressure which results in the activation of the electric apparatus by the pressure responsive switching device closing the switch contact of the battery power supply. Upon entrance of the vehicle into the receiving area the reception of the tone signal energy causes an output to be produced by the receiver wherein the control relay becomes energized. The energization of the control relay establishes an energizing circuit from the battery power supply to the first solenoid of the directional control valve for establishing a fluid communication path from the reservoir to the door operating cylinder for causing a door opening operation and upon expiration of a preselected time period the time delay relay interrupts the energizing circuit to the first solenoid. When the vehicle leaves the receiving area the receiver ceases to produce an output due to the loss of the tone signal energy so that the control relay becomes deenergized. The resulting deenergization of the control relay established anfl energizing circuit from the battery power supply to the second solenoid of the directional control valve for establishing a fluid communication path from the reservoir to the door operating cylinder for causing a door closing operation, and upon the expiration of a preselected time period the time delay relay interrupts the energizing circuit to the second solenoid. Obviously, since each vehicle of a train may be equipped with similar electropneumatic apparatus an entire train may be processed without the need of stopping.

We shall describe one form of an automatic door control system embodying our invention and shall then point out the novel features and advantages thereof in the appended claims.

The above objects and other attendant features and advantages of this invention will become more fully evident from the following detailed description when considered in conection with the accompanying drawings wherein.

Figure 1:
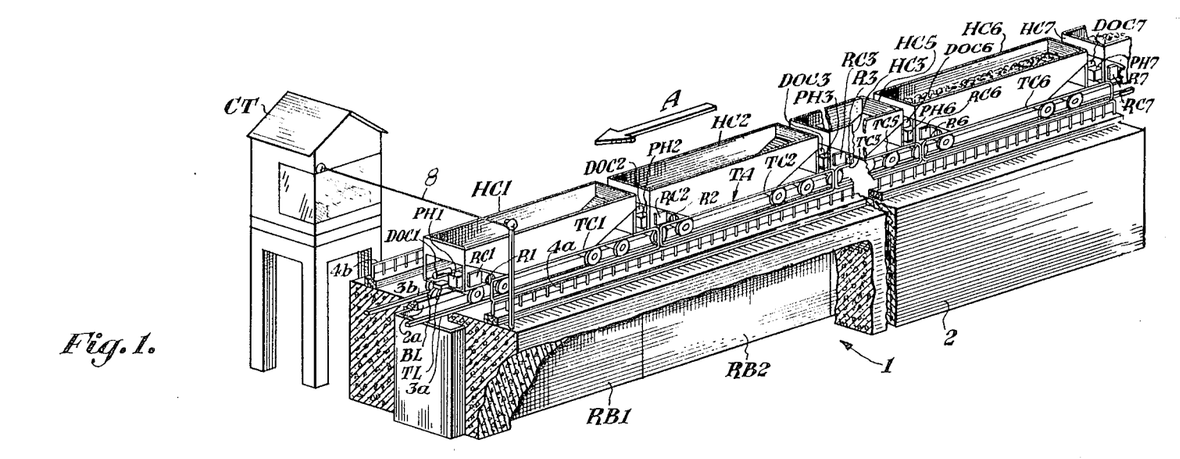
FIG. 1 is a perspective view, partly in section, of a railway coal dumping operation utilizing the automatic vehicle unloading system embodying our invention.

Referring to the drawings, wherein like parts are illustrated by like reference characters and, in particular to FIG. 1, there is shown a sectionalized view of an unloading site or dumping area generally illustrated by character 1 which may, for example, be conveniently located at a suitable steam power generating facility. Such an unloading area generally includes a trestle 2, which may be constructed of reinforced concrete, for accommodating appropriate coal receiving bins only two of which are shown and characterized by reference numerals RB1 and RB2 in FIG. 1. While only two receiving bins have been designated in FIG. 1, it should be understood that in actual practice six bins were employed in our dumping operation, however, it is readily apparent that the dumping area, and, particularly, the trestle construction may be arranged to accommodate any desired number of receiving bins. The upper deck or floor of the trestle 2 is provided with a longitudinal opening 2a which exposes the open tops of the receiving bins for the reception of coal. The upper deck is also arranged to accommodate the track rails 3a and 3b which may be suitably secured in any convenient manner thereto. A pair of hand rails 4a and 4b are suitably mounted in opposite sides of the railway track for the convenience and safety of attendants and authorized personnel working around or in the vicinity of the trestle. As shown in FIG. 1, the hand rail 4a has mounted on the upper surface thereof a plurality of transmitter coils TC1, TC2, TC3 (TC4, see FIG. 2), TC5 and TC6, which form the wayside transmitter loop or antenna TA, the operation and details of which will be described hereinafter. A control tower CT which houses the wayside car dumping apparatus and the other various equipment is suitably visually located near the dumping area. From this vantage point, an operator may control the wayside car-dumping apparatus and also, for example, the conveyor belt equipment which is utilized for moving or transporting the coal from the receiving bins to the other coal handling operation of the electrical steam generating facility. As illustrated in FIG. 1, a plurality of railway hopper cars HC1, HC2, HC3, HC5, HC6 and HC7, some of which are shown in section, of a unit-train moving in the direction of arrow A, with cars HC1–HC6 in the process of undergoing an unloading operation. As will be described in greater detail hereinafter, each hopper car is provided with a receiver coil RC, a protective housing PH for protecting various electric and pneumatic components, a door operating cylinder DOC, a reservoir R, a train line TL, each of which is numerically indexed in relation to the respective hopper car. Each hopper car is also provided with the necessary conduits or lines and conductors or leads for suitably interconnecting the pneumatic and electrical elements or components of the car-carried apparatus. The train line TL, like the brake line BL, of each car is suitably interconnected with each adjacent car from the unit-train. Accordingly, the auxiliary train line, like the standard brake line, runs the entire length of the train so that supervisory control can be exercised by the engineer. That is, the auxiliary train line can be charged or exhausted from the cab of the locomotive under the supervision of the engineer. As will become more readily evident hereinafter, such a supervisory control prevents the hopper cars of the train from being erroneously unloaded while enroute since the car-carried apparatus must be initially pneumatically conditioned. That is, while the train is enroute the pressure in the train line TL is normally exhausted, for example, to the atmosphere, and only upon approaching the dumping area will the engineer take an enabling action which charges the train line TL to a prescribed air pressure thereby pneumatically conditioning the car-carried apparatus of each hopper car of the unit-train.

The wayside apparatus which is normally housed within the control tower CT may be electrically inter-connected via, for example, an overhead conductor 8 to each of the transmitter coils TC1–TC6 which are mounted adjacent the railway track and form the transmitter loop or antenna TA. It should be noted that each of the receiving bins, wtih the exception of the last bin, namely, bin RB1, is provided with a suitable capacity operating mechanism which functions and indicates when its associated bin is filled to capacity. Each of these capacity mechanisms controls an associated electrical switch contact which is effective in shortening or lengthening the size of the transmitter loop or antenna TA thereby effectively representing the amount of space available for unloading, as will be described hereinafter. Further, it should be noted that while each hopper car is illustrated as being provided with only a single receiving coil, a similar receiving coil may be suitably mounted on the opposite-diagonal side of the car so that the train can pass over the dumping area in either direction or without regard as to how or to which end the cars were intercoupled. Similarly, the transmitter coils TC1–TC6 which form the transmitter loop TA may be suitably mounted on either side of the railway track without materially affecting the operation of the system.

Figure 2:
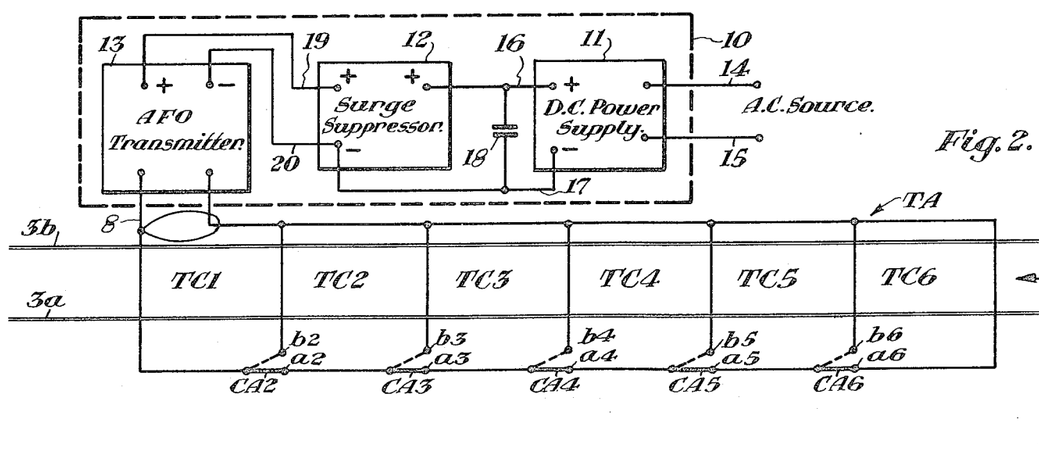
FIG. 2 is a schematic diagram of the wayside apparatus utilized in our automatic vehicle unloading system.

Referring now to FIG. 2, the wayside apparatus for the present invention, which is normally housed within the control tower CT, is shown within the dashed line block 10 while the transmitting coils TC1–TC6 which form the transmitter loop or antenna TA are illustrated as being horizontally disposed relative to the rails 3a and 3b. While in actual practice the transmitting coils are vertically disposed in relation to the track rails, it is convenient to schematically illustrate the coils as shown in FIG. 2 for the purpose of simplifying the illustration and facilitating the explanation thereof. However, it is obvious that the transmitting coils may be disposed in any suitable manner and may assume various configurations and in some cases may even comprise a pole-line arrangement extending along the trackway. Further, it is understood that the transmitter loop or antenna may consist of separate or individual impedance matched coils connected in parallel to the output of the transmitter 13 through suitable capacity operating mechanisms. It will be assumed for the purpose of convenience that the length of each transmitter coil corresponds to the length of each receiving bin.

The apparatus enclosed within the dashed line block 10 generally consists of a direct current power supply 11, a surge suppressor 12, and an AFO tone transmitter 13. The input to the direct current power supply is connected to a conventional source of alternating current of suitable voltage (110 volts, for example) through leads 14 and 15. The direct current power supply 11 may be of conventional design and may include a stepdown transformer and a full-wave rectifier for producing a suitable value of direct current output voltage on the positive and negative leads 16 and 17, respectively. A filter capacitor 18 is connected across leads 16 and 17 for smoothing the output of the direct current power supply. This direct current output is then passed through the surge suppressor 12 which protects the equipment from damage by transient or surge voltages caused by lightning or the like. The surge suppressor may be of conventional construction and may consist of an inductive choke serially connected between the positive input and output terminals and a capacitor and voltage break-down device connected in parallel across the output terminals. Leads 19 and 20 couple the output from the surge suppressor to the respective positive and negative supply terminals of the AFO transmitter 13. The AFO (audio frequency overlay) transmitter produces the necessary tone signals for controlling and initiating the car unloading operation. The transmitter is preferably completely transistorized and consists of an audio frequency oscillator, an intermediate class A amplifier, and a push-pull class B output stage. While a standard high power AFO transmitter generates output signals generally having a frequency of 1000 c.p.s. or 1500 c.p.s. a frequency of 2800 c.p.s. was employed in actual practice; however, it is readily understood that other signal frequencies may be used, if desired. The tone signals from the AFO transmitter 13 are supplied by a conductor 8, for example, a co-axial cable, to the transmitter loop TA which as previously mentioned, may be composed of the six transmitter coils TC1–TC6 In actual practice, the transmitter loop TA may consist of a single turn of wire whose length is determined by the capacity operating mechanism common to the first five receiving bins which operate the switch contact arms CA2–CA6. For example, the contact arms CA2–CA6 are controlled in accordance with the condition or availability of the receiving bins B2–B6, respectively. Normally, when a receiving bin is empty or not filled and therefore available for receiving coal, the contact arm CA engages a fixed cotnact $a$; however, when a receiving bin is filled, its contact arm CA will be moved into engagement with the fixed contact $b$. That is, fixed contacts $a2$–$a6$ represent a not-full condition of the receiving bins and fixed contacts $b2$–$b6$ represent a full condition of the receiving bins. Accordingly, the transmitter loop TA may be lengthened and shortened by the individual transmitter coils TC in accordance with the position assumed by the associated contact arms. In FIG. 2, it is assumed that all the receiving bins are available for unloading and therefore all the contact arms CA2–CA6 engage their fixed contacts $a2$–$a6$, respectively. Accordingly, the transmitting loop TA is composed of all six of the transmitting coils TC1–TC6.

Figure 3:
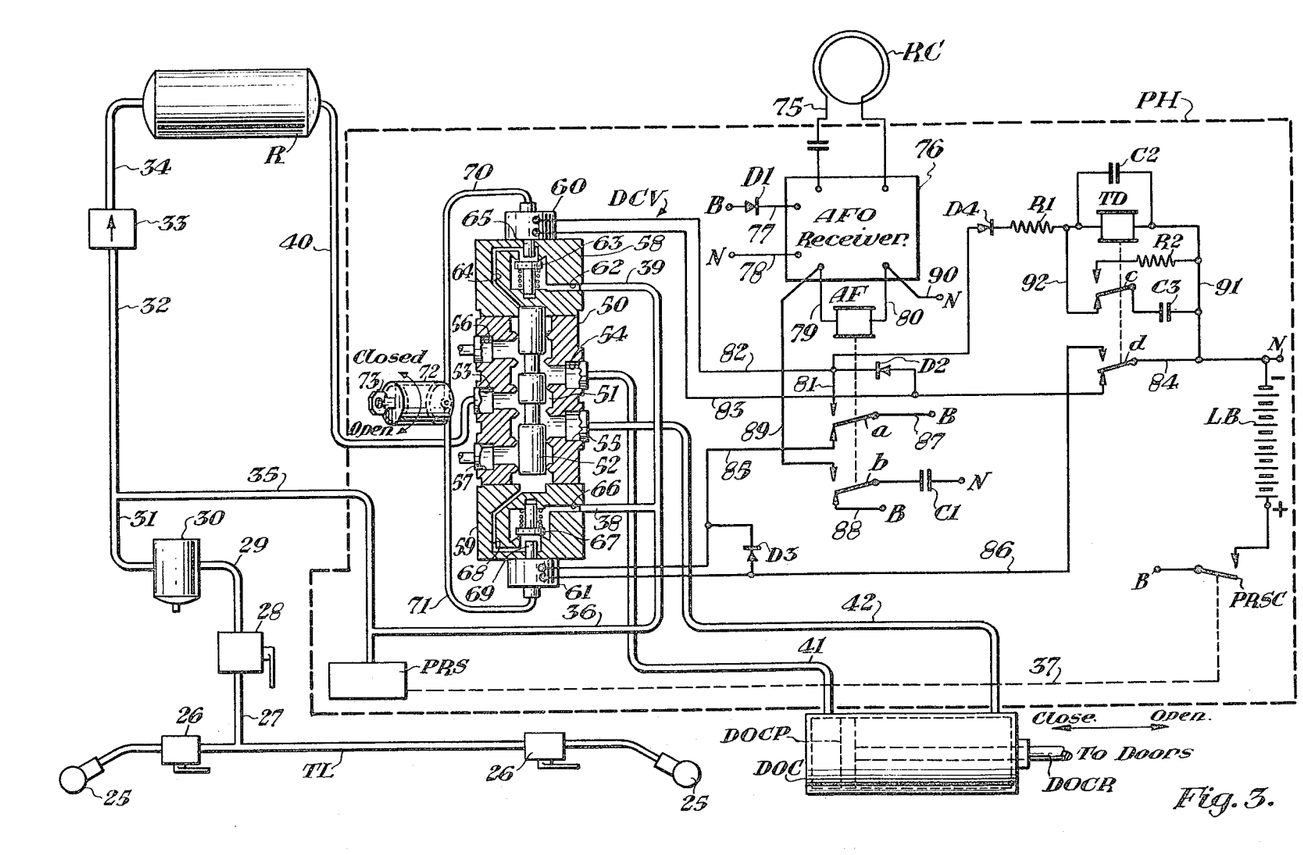
FIG. 3 is a schematic diagram of the vehicle-carried apparatus utilized in our automatic vehicle unloading system.

With reference to FIG. 3, there is illustrated the electropneumatic car-carried apparatus which is effective in opening and closing the doors of a hopper car. For the purpose of convenience, the apparatus of only one hopper car will be described in detail since it is readily understood that the remaining cars of the unit-train are provided with similar apparatus. As previously mentioned, each car is provided with a receiving coil RC, a protective housing PH (represented by the dashed line block) which encloses the electropneumatic control apparatus, a reservoir R, a train line TL, and a door operating cylinder DOC for opening and closing the hopper car doors. Each train line TL includes a pneumatic coupling 25 located at each end of the car, which may be similar to the standard brake line coupling, for interconnection with the adjacent hopper cars. A stopcock 26 is also conveniently located at each end of the hopper car for stopping or regulating the flow of air through the train line TL. Air is supplied from the train line TL through conduit or line 27 to a stockcock 28. The stopcock 28, in turn, is connected through line 29 to a filter 30 which minimizes or eliminates moisture, dust or other matter from entering the remaining parts of the pneumatic system. The filter 30 is connected through lines 31, 32 through check valve 33, the function of which will be described in greater detail hereinafter, through line 34, and to the input of the reservoir R. Line 31 is also connected through line 35, to a pilot supply line 36 and to a pressure responsive switch PRS. The pressure responsive switch is a commercially available pneumatically operated electrical contact device which is adapted to close its electrical contact when the fluid or air pressure reaches a predetermined or preselected value and which is adapted to open it electrical contact when the air pressure falls below a certain given value. The pressure responsive switch PRS is mechanically linked, as illustrated, by the dashed line 37 to switch contact PRSC which is electrically interposed between the terminal B and the positive side (+) of the battery supply source LB. The pilot supply line 36 is connected to a pair of air pilot ports of an electropneumatic directional control valve DCV by air pilot lines 38 and 39. The main supply of fluid pressure for operating the hopper car doors is taken from the output of the reservoir R to an input port of the pneumatic directional valve DCV by means of line 40. A line 41 is connected from a first output port of the pneumatic directional control valve DCV to one end of a door operating cylinder DOC, and a line 42 is connected from a second output port of the pneumatic directional valve DCV to the other end of the door operating cylinder DOC. The door operating cylinder DOC, which is shown in its door closed position, consists of a piston DOCP which reciprocates between an extreme right hand open position and an extreme left hand closed position. A cylinder rod DOCR has one end securely fastened to the piston DOCP and the other end suitably secured to the hopper car doors in any convenient manner. As will become evident, the position of the door operating cylinder piston DOCP and its rod DOCR will be determined by the pneumatic directional valve DCV.

The pneumatic directional valve DCV is an electropneumatic double stay-where-put spool valve provided with a manual overriding device and may be of the type shown and described in an application for Letters Patent of the United States Ser. No. 328,755, filed Dec. 6, 1963, now Patent No. 3,332,445, by Clifford W. Allen, for Solenoid Actuated Valve with Manual Override, and assigned to the assignee of the present patent application. The pneumatic directional control valve DCV is illustrated as including a main spool valve housing 50 having a central bore 51 for slidably receiving spool or plunger 52. The main casing or spool valve housing 50 includes a single input port 53 connected to line 40, a pair of output posts 54 and 55 connected to lines 41 and 42, respectively, and a pair of exhaust ports 56 and 57 which may be opened to atmosphere. Mounted on each end of the casing 50 are pilot valve housings 58 and 59 to which are suitably attached solenoid operators or devices 60 and 61. The upper pilot valve housing 58 includes a pilot port 62 which is connected by line 39 and a spring loaded valve device 63 which is normally biased upwardly, as shown, to a closed position for preventing the flow of fluid from the pilot port 62 to the spool actuating supply passage 64. The upper solenoid operator 60 may be of standard construction and may include an electrical coil and an armature or plunger 65 which moves downwardly, as viewed in FIG. 3, when the solenoid is energized. The plunger 65 is in co-axial alignment with the upper face of the valve device 63 so that downward movement of the plunger 65 effects an unseating of the valve device whereby a fluid communication path may be established from pilot port 62 to supply passage 64. Similarly, the air pilot housing 59 which is mounted on the lower end of the main casing 50 includes a pilot port 66 which is supplied by line 38. The lower air pilot housing 59 also includes a spring loaded valve device 67 which is normally biased downwardly, as shown in FIG. 3, for normally preventing fluid communication between the pilot port 66 and spool actuating supply passage 68. The lower solenoid 61 is identical in construction to the upper solenoid and includes an electrical coil and an armature plunger 69 which moves upwardly for unseating the valve device 67 when the solenoid coil is energized. The unseating of the valve device 67 by the plunger 69 is effective in establishing a fluid communication path between the pilot port 66 and supply passage 68.

As is readily obvious it is desirable to provide manual means whereby the hopper car may be unloaded of its contents in the event of electrical power failure. Accordingly, a manual override mechanism is provided on the pneumatic directional control valve DCV for effecting and simulating the operation of the electrical solenoids 60 and 61. However, certain safety precautions must be taken to ensure that only authorized personnel are capable of conducting a manual car unloading operation with the override mechanism. The manual override mechanism consists of a pair of operating arms 70 and 71 which cooperate with the upper and lower solenoids 60 and 61 respectively. Each operating arm cooperates with its respective solenoid plunger through a manual operating device, for example, of the type disclosed in the previously mentioned patent application Ser. No. 328,755, for mechanically depressing its respective solenoid plunger and unsealing its associated spring loaded valve device. The free end of each of the operating arms 70 and 71 is pivotally connected, for example, to the revolving plug of a cylinder lock 72 so that rotational displacement of the plug in a clockwise and a counterclockwise direction is effective in moving the operating arms upwardly or downwardly, as viewed in FIG. 3. To ensure that unauthorized personnel are unable to operate the manual override mechanism a proper key 73 must be inserted into the cylinder 72 for rotating the revolving plug of the lock. As a reminder to authorized personnel to always return the manual override mechanism to its neutral position, the lock is provided with a retainer pin which prevents withdrawal of the key from the lock when the mechanism is in the open or closed position.

Let us now turn to the electrical components which are employed in the car-carried apparatus. As previously mentioned, each hopper car includes a receiver coil RC which may be encapsulated and may consist of 100 turns of suitable wire. The receiving coil is suitably tuned by capacitor 75 to the particular frequency of tone signals being produced by the wayside transmitter 13 and radiated by transmitter loop or antenna TA. The receiving coil RC and capacitor 75 are connected to the input terminals of the AFO receiver 76. The AFO receiver 76 is preferably completely transistorized in order to obtain greater efficiency and generally includes a filter network for excluding all frequencies except the tone signal frequency, a two-stage input amplifier, a push-pull class B output stage, and a rectifier network for converting the tone signals into a direct current voltage output. The direct current supply or operating potential for AFO receiver 76 is connected to the B and N terminals from the switch-controlled battery supply source LB by conductors 77 and 78, respectively. A protective diode D1 is inserted in lead 77 to ensure that the application of a reverse supply voltage will not damage or destroy the components and particularly the transistors of the AFO receiver. One output terminal from the receiver 76 is connected to one side of the winding of control relay AF by conductor 79 and the other output terminal of the receiver is connected to the other side of the control relay winding by conductor 80.

Since railway trains and cars operate under some of the most adverse environmental conditions and particularly are exposed to severe shaking, it is advisable to utilize a control relay which is insensitive to shock and not affected by vibrations. Accordingly, it is advantageous to employ a control relay of the type shown and described in Letters Patent of the United States No. 2,283,270, granted to Robert M. Laurenson, on May 19, 1942, for Electrical Relays. For optimum operation, it is also advantageous to mount the relay in such a manner that its armature rotates about a horizontal plane and that its longitudinal axis extends parallel to the length of the railway car. Accordingly, when mounted in this position the control relay AF is substantially immune to any shock or vibration so that contact bounce which could cause erratic operation of the system is substantially eliminated. When no voltage is present on the output terminal of the receiver 76, control relay AF is deenergized and contact arms *a* and *b* are released so that their back points or contacts are closed and their front points or contacts are opened. The front point of contact arm *a* is shown connected to the coil of the solenoid operator 60 by leads 81 and 82, while the other side of the coil of solenoid operator 60 is connected by lead 83 to the back point of contact arm *d* of a time delay relay TD, which will presently be described, and by lead 84 to terminal N which is directly connected to the negative terminal (—) of the battery power supply LB. The back point of contact arm *a* is connected to one side of the coil of the solenoid operator 61 by lead 85, while the other side of the coil of solenoid operator 61 is connected by lead 86 to the front point of the contact arm *d* of relay TD. A pair of diodes D2 and D3 are connected across the coils of solenoids 60 and 61, respectively, and operate in the well known manner, to reduce and minimize the inductive kick or the transient voltage which occurs when the solenoids are de-energized. The contact arm *a* is directly connected by lead 87 to the switch-controlled battery terminal B. The back point of contact arm *b* is also connected to the switch-controlled battery contact B by lead 88. The front point of contact arm *b* is connected by lead 89 to one terminal of the output of the AFO receiver 76. The other output terminal of the AFO receiver is shown connected by lead 90 to the terminal N of the negative terminal (—) of the battery power supply source LB. The contact arm *b* is also connected to the terminal N of the negative terminal (—) of the battery supply source LB by capacitor C1, the function of which will be described in greater detail hereinafter.

The time delay relay TD functions as a battery energy-saver in that the solenoid operator coils, which require a substantial amount of power, are energized for only a limited amount of time. That is, the relay TD produces a pulse operation of the solenoid operator coils so that the life of the battery supply source LB may be extended over a considerable period of time. In actual practice, it has been found that a year's life can be expected from an alkaline type of battery supply source. As shown, one side of the winding of relay TD is connected through serially connected resistor R1 and diode D4 to lead 81 which, in turn, is connected to the front point of contact arm *a* of relay AF. The other side of the winding of relay TD is connected to the terminal N of the negative terminal (—) of the battery power supply by lead 91. A capacitor C2 is shown connected in shunt with the winding of time delay relay TD. Time delay relay TD includes a pair of contact arms, namely, contact arm *c* and previously mentioned contact arm *d*. The back point of contact arm *c* is directly connected by lead 92 to the one side of the winding of relay TD. The front point of contact arm *c* is connected through resistor R2 to lead 91. The contact arm *c* is also connected by capacitor C3 to lead 91 which, in turn, is connected by lead 84 to terminal N of the negative terminal (—) of battery supply source LB.

As previously mentioned, the railway hopper cars, and, therefore, the car-carried apparatus must operate under some of the most adverse weather conditions. For example, the hopper cars and their equipment, in many cases, are exposed to the bitter coldness of winter in which the temperature may drop into the sub-zero range. While various types of supply sources have been considered each proved unsatisfactory because of either size, cost, or the inability to deliver sufficient energy at low temperatures. However, by uniquely employing a plurality of size D alkaline cells which are connected in series-parallel relationship for obtaining the proper power capacity, we have found a supply source which operates satisfactorily even at temperatures as low as —40 degrees Fahrenheit. Further, the use of alkaline cells provides not only a reliable source of electrical energy but also an economical feasible source of power. In addition, by discretely limiting the high energy withdrawal periods to very short durations by pulse operating the coils of the solenoid operators, the useful life of the alkaline battery source has been extended to a maximum period of time.

In describing the operation of our invention, it may be of benefit to initially assume a unit-train in approach of the dumping area rather than being in the vicinity or over the dumping site, as shown in FIG. 1. Further, let us assume that the tower operator is aware of the approaching train and has energized the wayside equipment; however, it is readily understood that the wayside equipment may be continually energized or automatically energized by means of a suitable track circuit control arrangement, so that the tone signals are being radiated by the transmitter loop or antenna TA. It is further assumed that all the bins are available for receiving the coal during the initial unloading so that the contact arms CA2–CA6 engage their fixed contacts *a2*–*a6*, respectively, and therefore the transmitter loop or antenna TA is made up of all the transmitter coils TC1–TC6. Upon passing a predetermined or preselected wayside point the engineer initiates the supervisory control which enables or conditions the pneumatic apparatus carried by each hopper car of the unit-train. Specifically, the engineer charges the train line TL from the main compressor located in the locomotive. The charging of train line TL causes each reservoir R of each hopper car to be recharged through its affiliated line 27, valve 28, line 29, filter 30, line 31, line 32, check valve 33 and line 34, and causes also pressure build-up in lines 35, 36 and in air pilot lines 38 and 39. Upon reaching a predetermined fluid pressure, the pressure responsive switch PRS is effective in closing its switch contact PRSC. The closing of contact PRSC is effective in energizing the AFO receiver 76 through leads 77 and 78 and also in establishing a charging path for capacitor C1 over a circuit extending from the terminal B, through lead 88, the back point of contact arm *b*, through capacitor C1, and to the terminal N. It should be noted that the amount of current drained on the battery supply source LB during this pneumatic conditioned period is substantially negligible in that the AFO receiver 76 requires only about twenty-five (25) milliamperes when no tone signals are being received.

As previously mentioned, an essential requirement of the control relay AF is that it must be shock resistant since under the present assumed pneumatic conditioned period any contact bounce could initiate a false unloading operation while the train is still enroute. For example, with the car-carried apparatus pneumatically conditioned the closure of the back points by contact arms *a* and *b* of control relay AF would result in the energization of the solenoid operator 60 and also of the relay AF. With the solenoid operator 60 energized and the air pilot line 39 charged, the plunger 52 would be displaced to allow fluid from the reservoir R to displace the piston DOCP of the door operating cylinder DOC which would result in the opening of the hopper car doors and in the unloading of the car contents. As previously mentioned, such erratic or false operation has been entirely eliminated in the present instance by uniquely employing a balanced armature relay and by utilizing a special method of mounting the relay AF.

Let us now assume that the apparatus has functioned properly and the train is near the trestle and begins to enter the unloading area. As the initial hopper car passes the transmitter loop TA, which is now made up of all six transmitter coils TC, and particularly passes the transmitter coil TC6, radiated tone signals are received by the receiver coil RC of this first car. The received tone signals are amplified, converted and appear as a direct current output voltage for energizing the control relay AF. The energization of the control relay AF causes the contact arms *a* and *b* to open their back points and to close their front points. The closure of the front point by contact arm *a* causes a series of events to simultaneously occur. First, the solenoid operator 60 is energized by a circuit extending from the positive terminal B of the battery supply source LB, through lead 87, contact arm *a* and its front point, lead 81, lead 82, the coil of solenoid 60, lead 83, back point and contact arm *d* of relay TD, and lead 84 to the terminal N of the battery supply source LB. Second, the closure of the contact arm *a* and its front point also completes a circuit path to the relay TD and its associated components. However, the RC time constant of the TD relay circuit is so proportioned that a 100 millisecond delay occurs prior to the relay TD picking up. This delay in picking up of relay TD ensures that the solenoid operator 60 completes its movement prior to the interruption of its energizing circuit by the back point of contact arm *d* of relay TD. Normally the solenoid operator 60 completes its movement in less than 50 milliseconds so that the 100 millisecond delay is ample time for shifting the position of the pneumatic directional control valve and also within safe limits for ensuring proper operation of the pneumatic directional control valve. Third, the closure of the front point of contact arm *b* causes the charge of capacitor C1 to be applied to the winding of control relay AF. The capacitor C1 ensures that the control relay AF remains picked up even though a loss of the tone signal occurs. For example, it is advisable once the car doors are opened and unloading operation begins to continue the unloading operation until the hopper car is entirely emptied. Accordingly, an occasion may arise in which a particular bin may become filled while a car is still over it. The filling of the bin would cause the capacity mechanism to move its contact arm CA from the fixed contact *a* to its fixed contact *b* to thereby disconnect the associated transmitter coil or coils from the transmitter loop TA. Similarly, a transitory power failure caused by lightning or the like could affect the normal operation of the wayside apparatus. Obviously, either of these happenings could interrupt or cause a momentary loss of the tone signals; however, capacitor C1 ensures that the control relay AF remains picked up during such times.

The energization of the solenoid operator 60 results in the downward displacement of the solenoid plunger 65 which is effective in unseating the valve device 63. As previously mentioned, the electropneumatic valve operation is completed in approximately 50 milliseconds, and the unseating of the valve device 63 establishes a fluid communication path between air pilot port 62 and the spool actuating supply passage 64. The fluid pressure in air pilot line 39 is now permitted to bear against the upper surface of the main plunger 52 so that the plunger 52 is forced downwardly to its lower extreme position. The downward displacement of the plunger 52 is effective in establishing a fluid communication path between the input port 53 and the output port 54 and also in establishing a fluid path between the output port 55 and the exhaust port 57. Accordingly, fluid under pressure flows from the reservoir R through line 40, into input port 53, out of output port 54, through line 41, into the door operating cylinder DOC which causes the piston DOCP and its rod DOCR to be shifted toward its right hand open door position thereby opening the hopper car doors. Line 42, output port 55 and exhaust port 57 provide a fluid exhaust path for the air which is expelled during movement of the piston DOCP. Upon the expiration of the 100 millisecond time delay, the relay TD is picked up so that the back points of the contact arms *c* and *d* are opened while their front points are closed. The opening of the back point of contact arm *d* interrupts the energizing circuit for the solenoid operator 60 so that unnecessary power is no longer delivered to its coil. As previously mentioned, it is advisable to energize the solenoid coils of the directional control valve DCV only for the length of time necessary for effecting the desired operation because of the heavy power demands of the solenoids. That is, it is advantageous to merely pulse energize the solenoids so that extended battery life may be realized. The deenergization of the solenoid operator 60 causes a retraction of solenoid plunger 65 which results in the reseating of the valve device 63. However, this does not affect the remainder of the valve operation and the plunger 52 remains in its lower extreme position, since the directional control valve DCV is a stay-where-put spool valve. The closing of the front point by contact arm *c* establishes a circuit discharge path for capacitor C3 through resistor R2. The car-carried apparatus remains in this condition throughout the cars' travel over the receiving bins of the dumping area.

Upon the departure of the hopper car from the vicinity of the receiving bins, the tone signals are no longer received by the receiving coils RC so that no output is produced by the AFO receiver 76 and the control relay AF becomes deenergized. With the deenergization of the control relay AF the solenoid operator 62 is energized over a circuit path extending from the positive terminal B, through lead 87, the back point of contact arm *a*, through lead 85, through the coil of solenoid 61, through lead 86, over the front point of contact arm *d*, through lead 84, to the terminal N of the battery power supply LB. The energization of solenoid 61 causes plunger 69 to be displaced upwardly for unseating the valve device 67. The unseating of the valve 67 establishes a fluid communication path between the air pilot port 66 and the fluid supply passage 68. Accordingly, the fluid pressure in air plot line 38 causes upward displacement of the main plunger 52. The upward displacement of the plunger 52 results in the closing of the fluid path between the input port 53 and output port 54 and also between output port 55 and exhaust port 57. However, the upward displacement of the plunger 52 establishes a fluid communication path between input port 53 and output port 55 as well as a fluid communication path between output port 54 and exhaust port 56. Accordingly, fluid flows from the reservoir R through line 40, input port 53, output port 55, and line 42 and is effective in shifting the door operating cylinder piston DOCP to its extreme left-hand closed position. The exhausted fluid or air from cylinder DOC passes through line 41, output port 54 and exhaust port 56. The retraction of the piston results in the closing of the hopper car doors by the door operating cylinder rod DOCR. While the release of control relay AF establishes a circuit path for the door closing solenoid 61, the release of control relay AF also interrupts the energizing path to time delay relay TD by the opening of the front point of contact arm *a*. However, the relay TD remains picked up for approximately 100 milliseconds by the snubbing action or the charge on the capacitor C2. Solenoid operator 61, like solenoid operator 60, completes its movement in less than 50 milliseconds and therefore the 100 millisecond delay is sufficient time for ensuring proper operation of the pneumatic directional control valve. Upon expiration of the 100 millisecond period, the relay TD releases so that the front points of contact arms *c* and *d* become opened and their back points become closed. The opening of the front point of contact arm *d* interrupts the circuit to the coil of solenoid 61 so that plunger 69 is retracted and the valve device 67 is reseated. The plunger 52 of the directional control valve DCV remains in its upper extreme position as viewed in FIG. 3 since as previously mentioned the valve is a stay-where-put device. It is readily obvious that the car-carried apparatus now assumes the identical status or condition to that prior to the door opening operation caused by the reception of the transmitted tone signals. Further, it is understood that each of the hopper cars operates and undergoes a similar operation as each car passes over the pins and through the dumping area. Further, it is obvious that the relay TD is effective in limiting the amount of time that the solenoid operators 60 and 61 are energized so that heavy power demand on the alkaline battery source LB is minimized. This resulting pulse operation not only increases the life of the battery source LB but also improves the overall efficiency of the automatic vehicle unloading system.

Now when the last hopper car of the unit-train has been unloaded and the train passes beyond the unloading area, the engineer disables the car-carried apparatus by exhausting the entire auxiliary train line and, in turn, the train line TL of each car, for example, to atmosphere. The exhaustion of train line TL reduces the pressure in line 35 and, in turn, in pressure responsive switch PRS which is effective in opening the switch contact PRSC. The opening of switch contact PRSC effectively disconnects the battery supply source LB from all the electrical components of the car-carried apparatus. However, it should be noted that the exhaustion of train line TL has no effect on the fluid pressure within reservoir R since the check valve 33 prevents the fluid pressure of reservoir R from escaping to the train line TL. The residual air pressure remaining in the reservoir R not only constantly urges the hopper car doors to their closed position by continually forcing the piston DOCP of the door operating cylinder DOC to its extreme left-hand position over a fluid communication path established from reservoir R through line 40, input port 53, output port 55, and line 42 but also substantially reduces the recharging time of the pneumatic apparatus of the car to a minimum when the train again approaches the dumping area for a subsequent unloading operation. Further, since the air pilot lines 38 and 39 are also exhausted with the train line TL, the train may proceed to the mine site for loading and may safely return with a full load to the dumping area without fear of a false door opening operation occurring while enroute because the DCV can not change position without air in lines 38 and 39.

Further, it is obvious that the system operates in a failsafe manner in that failure of either the transmitter, receiver or any other vital electrical components is incapable of producing a door opening operation of the hopper car. Similarly, the loss of pneumatic pressure is incapable of causing a false door opening operation.

As is readily apparent from the above, a unique feature of the presently described automatic vehicle unloading system is the ability of the car-carried apparatus to operate properly and reliably even when exposed to the most adverse environmental surroundings, such as, extreme coldness and severe vibrations.

Another feature of the system in accordance with our invention is that it is possible for authorized personnel to manually operate the car-carried apparatus in cases of power failure.

Yet another feature of the system in accordance with our invention is that it is impossible to actuate the automatic car-carried apparatus for effecting a hopper car door opening operation while the train is enroute without an initial conditioning action on the part of the train engineer.

Yet another feature of the system in accordance with our invention is that once the hopper car doors are opened in the dumping area they remain open for a sufficient time to ensure the car is completely emptied of its contents even though the wayside tone signal is momentarily lost.

Another feature of the system in accordance with our invention is the capability of the wayside apparatus to actuate the car-carried apparatus for initiating a door opening operation in keeping with the availability and condition of the wayside receiving bins.

Yet another feature of the system in accordance with our invention is that of utilizing pulse energization in operating the solenoid operators of the directional control valve which materially increases and substantially extends the useful life of the battery power supply to a maximum period of time.

Still yet another feature of the system in accordance with our invention is that of retaining the residual pneumatic fluid pressure within the reservoir upon termination of an initial unloading operation in order to minimize the pneumatic recharging or conditioning of the pneumatic apparatus for a subsequent unloading operation.

Although we have shown and described our invention in relation to an automatic hopper car coal unloading system, it is readily evident that the invention is not merely limited thereto but may be employed in other industrial and commercial facilities which have need of our invention. For example, our invention may be utilized in an ore dumping facility, a grain-elevator operation, or even in a passenger discharge operation onto moving station platforms in the future rapid or mass transit functions. Similarly, our invention may be employed at a coal, a grain or an ore loading site which requires a door opening and closing operation due to the use of covered hopper cars. It is also understood that our invention may find utility in future moving platform station passenger loading operations of mass transit functions.

Having thus described our invention, what we claim is:

1. In a system for automatically opening the doors of a moving vehicle as it passes a first wayside point in a preselected area and for closing the doors of the moving vehicle as it passes a second wayside point in the preselected area comprising, wayside means located in the vicinity of said preselected area for producing a signal within a space defined by said first and second wayside points and including a transmitter and a variable length antenna for changing the space defined by said first and second wayside points, vehicle-carried means including electric pneumatic apparatus which is electrically responsive upon reception of said signal as said vehicle passes said first wayside point for effecting a pneumatic door opening operation and which is electrically responsive upon interruption of said signal as said vehicle moves past said second wayside point for effecting a pneumatic door closing operation.

2. In a system for automatically opening the doors of a moving vehicle as it passes a first wayside point in a preselected area and for closing the doors of the moving vehicle as it passes a second wayside point in the preselected area comprising, wayside means located in the vicinity of said preselected area for producing a signal within a space defined by said first and second wayside points, vehicle-carried means including electric pneumatic apparatus, said electric pneumatic apparatus including a receiver and a tuned coil, a solenoid operated directional control valve and a door opening cylinder, and a first and second relay circuit means for pulse energizing said solenoid operation of the directional control valve from a direct current supply source so that said electric pneumatic apparatus is electrically responsive upon reception of said signal as said vehicle moves past said first wayside point for effecting a pneumatic door opening operation and is electrically responsive upon the interruption of said signal as said vehicle moves past said second wayside point for effecting a pneumatic door operation.

3. In a system for automatically opening the doors of a moving vehicle as it passes a first wayside point in a preselected area and for closing the doors of the moving vehicle as it passes a second wayside point in the preselected area comprising, wayside means located in the vicinity of said preselected area for producing a signal within a space defined by said first and second wayside points, vehicle-carried means including electric pneumatic apparatus, said electric pneumatic apparatus including a receiver and a tuned coil, a solenoid operated directional control valve and a door opening cylinder, said solenoid operated directional control valve including a pair of air pilot valve mechanisms cooperatively associated with a stay-where-put spool valve device for controlling said door operating cylinder so that said electric pneumatic apparatus is electrically responsive upon reception of said signal as said vehicle moves past said first wayside point for effecting a pneumatic door opening operation and is electrically responsive upon the interruption of said signal as said vehicle moves past said second wayside point for effecting a pneumatic door closing operation.

4. In a system for automatically effecting a door opening and closing operation of a vehicle as it moves through a predetermined area along a wayside comprising, wayside means located in the vicinity of the area and including a transmitter for producing a tone frequency signal and an antenna for radiating said tone frequency signal in said predetermined area, vehicle-carried means including electric pneumatic apparatus which is initially pneumatically conditioned prior to the entry of a vehicle into the area, and which is electrically actuated by the presence of said wayside signal upon the egress of the vehicle into the area for pneumatically opening the doors of the vehicle, and which is electrically actuated by the absence of said wayside signal upon the egress of the vehicle from the area for pneumatically closing the doors of the vehicle.

5. A system as set forth in claim 2, wherein said solenoid operated directional control valve includes a manual override mechanism which is capable of simulating a door opening and closing operation during a direct current supply source failure.

6. A system as set forth in claim 5, wherein said manual override mechanism includes a locking means for permitting manual operation of said solenoid operated directional control valve by said override mechanism only after insertion of a proper key into said locking means.

7. A system as set forth in claim 2, wherein said vehicle-carried means includes a reservoir which is recharged to a predetermined pressure value prior to the vehicle passing said first wayside point through an auxiliary pneumatic line.

8. A system as set forth in claim 7, wherein said vehicle-carried means includes a pressure responsive switch which is effective in closing a switch control contact associated with said direct current supply source.

9. A system as set forth in claim 8, wherein said vehicle-carried means includes an energy storage means which ensures that once initiated the pneumatic door opening operation is completed for sufficient time to ensure a normal car emptying cycle even though the reception of said signal is momentarily interrupted.

10. A system as set forth in claim 2, wherein said direct current supply source includes a plurality of alkaline type batteries.

11. A system as set forth in claim 2, wherein said first relay circuit means includes a balanced armature type of relay which is specifically oriented in relation to the vehicle to substantially eliminate the effects of shock and vibration.

12. A system as set forth in claim 2, wherein said second relay circuit means includes a time delay relay for effecting the pulse energization of said solenoid operated directional control valve.

13. A system as set forth in claim 1, wherein said variable length antenna includes a plurality of transmitting coils.

14. A system as defined in claim 4, wherein said vehicle-carried means includes at least one coil and a receiver responsive to said tone frequency signal.

15. A system as defined in claim 4, wherein said antenna includes a plurality of switch controlled transmitter coils circumscribing said predetermined area.

16. A system as defined in claim 15, wherein said wayside means includes a plurality of operating mechanisms cooperatively associated with said plurality of switch controlled transmitter coils for determining the length of said antenna in accordance with the amount of available space within said predetermined area.

17. A system as defined in claim 4, wherein said electropneumatic apparatus includes a pressure responsive device and a solenoid directional control valve receptive to the intial pneumatic conditioning of said vehicle-carried means.

18. A system as defined in claim 17, wherein said vehicle-carried means includes a switch controlled electrical energy source which is activated when and only when said pressure responsive device is pneumatically conditioned.

19. A system as defined in claim 18, wherein said electrical energy source comprises a direct current power supply.

20. A system as defined in claim 19, wherein said direct current power supply includes a plurality of alkaline type batteries.

21. A system as defined in claim 18, wherein said electropneumatic apparatus includes a reservoir which is charged to a given value during the initial pneumatic conditioning of said vehicle-carried means.

22. A system as defined in claim 21, wherein said electropneumatic apparatus includes a door operating cylinder pneumatically connected to said reservoir through and under control of said solenoid directional control valve.

23. A system as defined in claim 22, wherein said vehicle-carried means includes electrical circuit means electrically associated with said solenoid directional control valve and said direct current power supply.

24. A system as defined in claim 23, wherein said electrical circuit means includes a capacitive storage means electrically associated with said control relay means for ensuring completion of the door opening operation.

25. A system as defined in claim 23, wherein said electrical circuit means includes a control relay means for energizing said solenoid directional control valve for initiating a door opening operation by establishing a first communication path between said door operating cylinder and said reservoir when said tone frequency signal is received by said receiver.

26. A system as defined in claim 25, wherein said control relay means includes a balanced armature type of relay which is immune to shock and vibration.

27. A system as defined in claim 25, wherein said electrical circuit means includes a timing means for limiting the period of time said solenoid directional control valve is energized.

28. A system as defined in claim 27, wherein said timing means includes a relay controlled resistive-capacitive network.

29. A system as defined in claim 25, wherein said control relay means reenergizes said solenoid directional control valve for initiating a door closing operation by establishing a second communication path between said door operating cylinder and said reservoir when said tone frequency signal is no longer being received by said receiver.

30. A system as defined in claim 29, wherein said timing means limits the period of time said solenoid directional control valve is reenergized.

31. A system as defined in claim 29, wherein said solenoid directional control valve includes a manual override mechanism for simulating a door opening and closing operation during failure of said electrical circuit means.

32. A system as defined in claim 31, wherein said manual override mechanism includes a lock means which requires the insertion of a proper key prior to permitting the simulated door opening and closing operation.

33. A system for automatically unloading railway vehicles of a moving train into selected ones of a plurality of receiving bins defining an unloading area in the trackway comprising, a wayside transmitter for generating a tone signal, a variable length antenna including a plurality of switch controlled transmitter coils for radiating said tone signal into said unloading area in accordance with the availability of the selected ones of said plurality of receiving bins, a receiver and a tuned coil carried by each of said railway vehicles and responsive to said tone signal, a pneumatic system including a rechargeable reservoir, a pressure responsive switching device, a directional control valve having a first and a second solenoid, and a door operating cylinder carried by each of said railway vehicles for pneumatically opening and closing the doors of its respective railway vehicle, an electrical control circuit including a receiver controlled relay and a time delay relay carried by each of said railway vehicles and electrically interconnected between a power supply source and said first and second solenoids of said directional control valve, and an auxiliary train line extending the entire length of the train and controlled from the locomotive cab for initially conditioning said railway vehicles of the train in approach of said unloading area by recharging said pneumatic system which causes the receiver and control circuit to be electrically activated by said pressure responsive switching device so that as each railway vehicle enters said unloading area and receives said tone signal from the selected ones of said plurality of transmitter coils forming said radiating antenna the receiver control relay establishes an energizing circuit from said power supply source to the first solenoid of said directional control valve for establishing a communication path from said reservoir to said door operating cylinder for causing a door opening operation and upon expiration of a preselected time period the time delay relay interrupts the energizing circuit to said first solenoid, and as each railway vehicle leaves said unloading area and no longer receives said tone signal the receiver control relay establishes an energizing circuit from said power supply source to the second solenoid of said directional control valve for establishing a communication path from said reservoir to said door operating cylinder for causing a door closing operation and upon expiration of a preselected time period the time delay relay interrupts the energizing circuit to said second solenoid, and as the entire train passes beyond said unloading area said auxiliary train line is exhausted so that said pressure responsive switching device deactivates the receiver and control circuit of each railway vehicle.

34. In an automatic vehicle door opening and closing system having a plurality of separate receiving areas comprising, wayside means including a power supply, a surge suppressor, a transmitter and a variable length antenna located in the vicinity of said receiving areas and electrically interconnected for producing and radiating a signal in accordance with the availability of said receiving areas, said variable length antenna including a plurality of transmitter coils corresponding to the number of receiving areas, selected ones of said plurality of receiving areas having capacity switching means electrically associated with selected ones of said plurality of transmitter coils, said switching means functioning to electrically disconnect selected ones of said plurality of transmitter coils from said antenna when associated selected ones of said plurality of receiving areas are filled to capacity so that said signal is only radiated by said transmitter coils forming said antenna, and vehicle-carried means responsive to said radiated signal for effecting a door opening and closing operation in accordance with the availability of said receiving areas.

35. In an automatic vehicle door opening and closing system having a receiving area comprising, wayside means located in the vicinity of said receiving area for producing a signal, vehicle-carried means including a pneumatic system having a rechargeable train line, a reservoir, a pressure responsive switching device, a directional control valve having a first and a second solenoid, and a door operating cylinder pneumatically interconnected and initially conditioned prior to the entry of the vehicle into said receiving area, and including an electrical system having a control relay, a timing relay, a tuned coil, receiver and a power supply which is electrically activated by said pressure responsive switching device when said pneumatic system is initially conditioned, said receiver producing an output upon reception of said signal for energizing said control relay for electrically interconnecting said first solenoid and said power supply thereby causing said directional control valve to establish a fluid communication path from said reservoir to said door operating cylinder and effecting a door opening operation as the vehicle enters said receiving area and said timing relay interrupting the energizing of said first solenoid upon expiration of a predetermined time period, and said receiver output terminating upon loss of said signal for deenergizing said control relay for electrically interconnecting said second solenoid and said power supply thereby causing said directional control valve to establish a fluid communication path from said reservoir to said door operating cylinder and effecting a door closing operation as it passes beyond said receiving area and said timing relay interrupting said energization circuit of said second solenoid upon the expiration of a predetermined time period.

36. An automatic railway vehicle door control system comprising, wayside apparatus including a tone signal transmitter having its input electrically coupled to an alternating current energy source through a surge suppressor and a direct current power supply, a switch controlled variable length antenna electrically coupled to the output of said transmitter for radiating the tone signal energy produced by said transmitter, vehicle-carried apparatus having an interrelated electric pneumatic system for controlling the vehicle door operation, said pneumatic system including a rechargeable train line pneumatically coupled through a check valve to the input of a reservoir and pneumatically coupled to a pressure responsive switching device and to a pair of air pilot input ports of a stay-where-put directional control valve having a pair of solenoids and including a key operated manual override mechanism, said directional control valve having an input port pneumatically coupled to the output of said reservoir and having a pair of output ports pneumatically coupled to opposite ends of a door operating cylinder and having a pair of exhaust ports open to the atmosphere, said door operating cylinder having a piston and a rod movable between a first extreme door opening position and a second extreme door closing position, said electric system including a coil tuned to receive said tone signal energy, said coil electrically coupled to the input of a receiver, a battery power supply having a first fixed terminal and a second switch controlled terminal, said second switch controlled terminal including an electrical contact mechanically coupled to said pressure response switch device, said first and second supply terminals electrically coupled through a protective diode to the direct current supply input of said receiver, the output of said receiver electrically coupled to the opposite sides of the winding of a control relay having a pair of two-position contact arms, one of said contact arms being electrically coupled to said second supply terminal and the other of said contact arms being coupled through a capacitor to said first supply terminal, said first supply terminal being electrically coupled to the back contact of said other contact arm, the front contact of said other contact arm electrically coupled to one side of said control relay winding, the other side of said relay winding electrically coupled to said first supply terminal, the back contact of said one contact arm electrically coupled to one side of the coil of one of said pair of solenoids, the front contact of said one contact arm electrically coupled to one side of the coil of the other said pair of solenoids and electrically coupled through a series connected diode and resistor to one side of the winding of a timing relay having a first and a second two-position contact arm, the other side of the winding of said timing relay being electrically coupled to said first supply terminal, said first contact arm electrically coupled through a capacitor to said first supply terminal, said second contact arm electrically coupled to said first supply terminal, the front contact of said first contact arm electrically coupled through a resistor to said first supply terminal, the back contact of said first contact arm electrically connected to said one side of said timing relay winding, a snubbing capacitor connected across said timing relay winding, the front contact of said second contact arm electrically coupled to the other side of the coil of said first solenoid, the back contact of said second contact arm electrically coupled to the other side of the coil of said second solenoid, and a diode connected across the coils of said first and second solenoid.

37. In a system for automatically opening the doors of a moving vehicle as it passes a first wayside point in a preselected area and for closing the doors of the moving vehicle as it passes a second wayside point in the preselected area comprising, wayside means located in the vicinity of said preselected area for producing a signal within a space defined by said first and second wayside points, said wayside means including a transmitter and a variable length antenna for changing the space defined by said first and second wayside points, said variable length antenna including a plurality of transmitting coils, said preselected area including a plurality of receiving bins having capacity operated switch means electrically associated with said plurality of transmitting coils for controlling the space defined by said first and second wayside points and the length of said variable antenna in accordance with the availability of said receiving bins, and vehicle-carried means including electropneumatic apparatus which is electrically responsive upon reception of said signal as said vehicle moves past said first wayside point for effecting a pneutamic door opening operation and which is electrically responsive upon interruption of said signal as said vehicle moves past said second wayside point for effecting a pneumatic door closing operation.

References Cited
UNITED STATES PATENTS

| | | |
|---|---|---|
| 3,173,381 | 3/1965 | Charles et al. |
| 3,214,039 | 10/1965 | Livingston __________ 214—64 |
| 3,295,704 | 1/1967 | Gillick et al. ________ 214—58 |

ROBERT G. SHERIDAN, *Primary Examiner.*

U.S. Cl. X.R.

105—240